(12) United States Patent
Kwon et al.

(10) Patent No.: US 12,330,688 B2
(45) Date of Patent: Jun. 17, 2025

(54) DELIVERY SERVICE SYSTEM AND METHOD USING AUTONOMOUS VEHICLES

(71) Applicant: Daegu Gyeongbuk Institute of Science and Technology, Daegu (KR)

(72) Inventors: Soon Kwon, Daegu (KR); Jae Suck Kim, Yongin-si (KR); Jae Hyeong Park, Gyeongsan-si (KR); Jin Hee Lee, Daegu (KR)

(73) Assignee: Daegu Gyeongbuk Institute of Science and Technology, Daegu (KR)

( * ) Notice: Subject to any disclaimer, the term of this patent is extended or adjusted under 35 U.S.C. 154(b) by 17 days.

(21) Appl. No.: 18/269,795

(22) PCT Filed: Dec. 27, 2021

(86) PCT No.: PCT/KR2021/019909
§ 371 (c)(1),
(2) Date: Jun. 27, 2023

(87) PCT Pub. No.: WO2022/145912
PCT Pub. Date: Jul. 7, 2022

(65) Prior Publication Data
US 2024/0067226 A1    Feb. 29, 2024

(30) Foreign Application Priority Data

Dec. 30, 2020  (KR) .......................... 10-2020-0187507

(51) Int. Cl.
*B60W 60/00* (2020.01)
*B60P 3/07* (2006.01)
(Continued)

(52) U.S. Cl.
CPC ......... *B60W 60/00256* (2020.02); *B60P 3/07* (2013.01); *B60W 40/06* (2013.01);
(Continued)

(58) Field of Classification Search
CPC ........... B60W 60/00256; B60W 40/06; B60W 2300/145; B60W 2420/00;
(Continued)

(56) References Cited

U.S. PATENT DOCUMENTS 10,303,171 B1 *  5/2019  Brady .................. G05D 1/0088
10,613,533 B1    4/2020  Payson et al.
(Continued)

FOREIGN PATENT DOCUMENTS

JP    2002-205824 A    7/2002
JP    2004-323203 A    11/2004
(Continued)

OTHER PUBLICATIONS

Korean Office Action for 10-2020-0187507 issued Jun. 21, 2023 from Korean Intellectual Property Office.
(Continued)

*Primary Examiner* — Ramon A. Mercado
*Assistant Examiner* — Ellis B. Ramirez
(74) *Attorney, Agent, or Firm* — Sughrue Mion, PLLC

(57) ABSTRACT

The present invention relates to a technical idea for providing a delivery service on regular and irregular roads using autonomous vehicles. More specifically, the present invention relates to technology in which, on a regular road, a lead vehicle and at least one droid vehicle are coupled to each other and a delivery service is provided based on autonomous driving; and on an irregular road, the coupling between the lead vehicle and the droid vehicle is automatically released and the droid vehicle provides a delivery service by remotely controlling the driving of the droid vehicle by the lead vehicle in the last mile delivery section corresponding to the irregular road. According to one embodiment of the present invention, a system for providing a delivery service using autonomous vehicles may provide a
(Continued)

delivery service on an irregular road where entry of normal vehicles is not allowed and a regular road where entry of small and low-speed vehicles is not allowed and may include a droid vehicle for providing a delivery service using limited autonomous driving performance in a last mile delivery section corresponding to the irregular road; and a lead vehicle for providing a delivery service based on autonomous driving on the regular road, transporting the droid vehicle by being coupled to the droid vehicle on the regular road, and remotely controlling driving of the droid vehicle after being separated from the droid vehicle in the last mile delivery section.

12 Claims, 11 Drawing Sheets

(51) Int. Cl.
*B60W 40/06* (2012.01)
*G05D 1/00* (2024.01)

(52) U.S. Cl.
CPC ..... *G05D 1/0016* (2013.01); *B60W 2300/145* (2013.01); *B60W 2420/00* (2013.01); *B60W 2556/35* (2020.02); *B60W 2556/40* (2020.02); *B60W 2556/65* (2020.02)

(58) Field of Classification Search
CPC ......... B60W 2556/35; B60W 2556/40; B60W 2556/65; B60W 10/26; B60W 60/00; B60W 30/10; B60W 30/143; B60W 40/02; B60W 40/105; B60W 2050/0005; B60W 2050/0064; B60W 2520/10; B60W 2720/28; B60P 3/07; G05D 1/0016; G05D 2105/28; G05D 2107/13; G05D 2107/17; G05D 2109/10; G05D 1/692; G05D 1/225; G05D 1/667; G05D 1/6985; B60Y 2200/148; B60Y 2200/30; B60Y 2300/10; B60Y 2300/143
USPC ......... 701/23, 2, 24, 32.3, 66; 340/989, 991, 340/994; 705/330, 333
See application file for complete search history.

(56) References Cited

U.S. PATENT DOCUMENTS

| | | | |
|---|---|---|---|
| 10,712,746 | B2 | 7/2020 | Li et al. |
| 2014/0254896 | A1 | 9/2014 | Zhou et al. |
| 2018/0321689 | A1* | 11/2018 | Lehmann ............... G08G 1/163 |
| 2019/0179313 | A1* | 6/2019 | Brady ................. G05D 1/0276 |
| 2019/0220044 | A1* | 7/2019 | Ruth .................... G05D 1/0287 |
| 2019/0287063 | A1* | 9/2019 | Skaaksrud ......... G06Q 10/0832 |
| 2019/0317498 | A1* | 10/2019 | Mere ....................... H04W 4/40 |
| 2020/0130829 | A1* | 4/2020 | Gandiga .............. G05D 1/0061 |
| 2020/0202293 | A1* | 6/2020 | Newell ............. G06Q 10/0833 |
| 2020/0341467 | A1* | 10/2020 | Glendenning ..... G06Q 10/0832 |
| 2021/0129870 | A1* | 5/2021 | Jung ............... B60W 60/00256 |

FOREIGN PATENT DOCUMENTS

| | | |
|---|---|---|
| JP | 2017-145073 A | 8/2017 |
| JP | 2017-145075 A | 8/2017 |
| JP | 2019-128801 A | 8/2019 |
| KR | 10-1981105 B1 | 5/2019 |
| KR | 10-2019-0060335 A | 6/2019 |
| KR | 10-2019-0086408 A | 7/2019 |
| KR | 10-2019-0104011 A | 9/2019 |
| KR | 10-2019-0137195 A | 12/2019 |
| KR | 10-2020-0097482 A | 8/2020 |

OTHER PUBLICATIONS

International Search Report for PCT/KR2021/019909 dated Mar. 29, 2022.

* cited by examiner

300

330

400

430

DELIVERY SERVICE SYSTEM AND METHOD USING AUTONOMOUS VEHICLES

CROSS-REFERENCE TO RELATED APPLICATION

This application is a National Stage Entry of PCT International Application No. PCT/KR2021/019909, which was filed on Dec. 27, 2021, and claims priority to Korean Patent Application No. 10-2020-0187507, filed on Dec. 30, 2020, in the Korean Intellectual Property Office, the disclosure of which is incorporated herein by reference.

TECHNICAL FIELD

The present invention relates to a technical idea for providing a delivery service on regular and irregular roads using autonomous vehicles. More specifically, the present invention relates to technology in which, on a regular road, a lead vehicle and at least one droid vehicle are coupled to each other and a delivery service is provided based on autonomous driving; and on an irregular road, the coupling between the lead vehicle and the droid vehicle is automatically released and the droid vehicle provides a delivery service by remotely controlling the driving of the droid vehicle by the lead vehicle in the last mile delivery section corresponding to the irregular road.

BACKGROUND ART

Recently, applications using autonomous driving-based mobility, including autonomous vehicles, are attracting attention.

For example, autonomous driving-based mobility can be applied to various fields such as an autonomous driving shuttle, an on-demand robot taxi, autonomous driving parcel delivery, an autonomous vehicle-based mobile unmanned locker, autonomous driving food delivery, and autonomous driving-based advertising.

FIG. 1 is a diagram for explaining the operable region of a conventional autonomous vehicle and autonomous driving mobility.

That is, FIG. 1 illustrates an operable region 100 of the conventional autonomous vehicle and the autonomous driving mobility.

Referring to FIG. 1, the operable region 100 of the conventional autonomous vehicle and the autonomous driving mobility may be divided into a regular road 110 and an irregular road 120. An autonomous vehicle 130 may operate on the regular road 110, but not on the irregular road 120.

In addition, autonomous driving mobility 140 may operate on the irregular road 120, but may not enter on the regular road 110.

Mobility capable of autonomous driving may be divided into a form of the autonomous vehicle 130 capable of driving while complying with the laws of regular roads or a form of the autonomous driving mobility 140 capable of operating in irregular road sections, also called "last mile sections".

For example, when a parcel vehicle in the form of a truck is replaced by the autonomous vehicle 130, the location where the parcel may be delivered will be a place where the vehicle may stop, and a delivery man will proceed to the last mile section.

If there is no separate delivery person from driving to a final destination to a collection point, the autonomous vehicle 130 should be able to move as close to the destination as possible.

However, most areas in a downtown area have a structure in which it is difficult for general vehicles to enter spaces adjacent to sidewalks or buildings for safety reasons.

For this reason, in autonomous driving mobility-based services, an autonomous driving system based on the small autonomous driving mobility 140, which is optimized for non-road sections, is being developed.

For example, 'Amazon' in the US and 'People of Delivery' in Korea have shown that small autonomous driving mobility safely delivers customers' items or food to destination thereof through pedestrian walking zones.

However, these small mobility-based autonomous driving platforms have limitations in understanding various driving environments of non-standardized walking or moving routes in a city and securing accurate driving performance.

In addition, since the cost of configuring an autonomous driving system for understanding and processing a highly complex environment is high, mass production of the autonomous driving system is difficult.

In particular, there is a disadvantage that an autonomous driving service may be provided only within a certain range due to limitations in platform movement speed or performance.

DISCLOSURE

Technical Problem

Therefore, the present invention has been made in view of the above problems, and it is one object of the present invention to provide a system and method for providing a delivery service using autonomous vehicles in which, on a regular road, a lead vehicle and at least one droid vehicle are coupled to each other and a delivery service is provided based on autonomous driving; and on an irregular road, the coupling between the lead vehicle and the droid vehicle is automatically released and the droid vehicle provides a delivery service by remotely controlling the driving of the droid vehicle by the lead vehicle in the last mile delivery section corresponding to the irregular road.

It is another object of the present invention to provide a system and method for providing a delivery service using autonomous vehicles that are capable of, in an autonomous driving logistics delivery service, responding to two driving environments in a mixed condition of a section where the traffic laws is applied to a place where the movement of ultra-small vehicles and low-speed mobility is not permitted and a last mile section where entry of general vehicles is not allowed.

It is still another object of the present invention to integrally collect sensor data of a lead vehicle and sensor data of a droid vehicle in consideration of the arrangement position of sensors in a structure in which the lead vehicle and the droid vehicle are mutually coupled and to efficiently reduce the cost required for constructing computing resources by distributing and processing the collected sensor data using the processor of the lead vehicle and the processor of the droid vehicle.

It is still another object of the present invention to overcome limitations in constructing an autonomous driving environment for a droid vehicle and to improve autonomous driving performance of the droid vehicle by remotely controlling the droid vehicle after the droid vehicle is separated from a lead vehicle.

It is yet another object of the present invention to improve the efficiency of resource consumption based on a cooperative structure between an autonomous vehicle and an autonomous droid by mutually sharing physical resources such as sensors, batteries, and processors of the lead vehicle and the droid vehicle in a coupling structure between the lead vehicle and the droid vehicle.

Technical Solution

In accordance with one aspect of the present invention, provided is a system for providing a delivery service using autonomous vehicles, wherein the system provides a delivery service on an irregular road where entry of normal vehicles is not allowed and a regular road where entry of small and low-speed vehicles is not allowed and includes a droid vehicle for providing a delivery service using limited autonomous driving performance in a last mile delivery section corresponding to the irregular road; and a lead vehicle for providing a delivery service based on autonomous driving on the regular road, transporting the droid vehicle by being coupled to the droid vehicle on the regular road, and remotely controlling driving of the droid vehicle after being separated from the droid vehicle in the last mile delivery section.

The lead vehicle may include first multiple sensors and perform the autonomous driving, the droid vehicle may include second multiple sensors and provide the limited autonomous driving performance, and when the lead vehicle is coupled to the droid vehicle, the lead vehicle may selectively drive the first multiple sensors and the second multiple sensors in a distributed manner to recognize all directions for the coupled state between the lead vehicle and the droid vehicle, and may perform autonomous driving on the regular road based on the recognized all directions.

When the lead vehicle is coupled to the droid vehicle, the lead vehicle may recognize a relative location of the droid vehicle and may selectively drive the first multiple sensors and the second multiple sensors in a distributed manner based on the recognized relative location to collect integrated sensor data.

The lead vehicle may include a first processor for processing first sensor data of the first multiple sensors, the droid vehicle may include a second processor for processing second sensor data of the second multiple sensors, and when the lead vehicle is coupled to the droid vehicle, some of the integrated sensor data may be processed using the first processor, the remaining data except for the partial data may be transmitted to the droid vehicle, and the remaining data may be processed using the second processor.

When the lead vehicle is coupled to the droid vehicle, the lead vehicle may collect the integrated sensor data by minimizing an overlapping area of the first sensor data and the second sensor data.

The lead vehicle may calculate a position using the first multiple sensors, may calculate an initial position of the droid vehicle using the first multiple sensors, may calculate a final position of the droid vehicle using the calculated initial position and second multiple sensors-based second sensor data transmitted from the droid vehicle, may detect surroundings at the calculated final position using the second sensor data, and may remotely control driving of the droid vehicle in consideration of the detected surroundings.

The lead vehicle may apply the calculated final position to precision map information to calculate a driving route to a destination where the delivery service is provided, and may remotely control driving of the droid vehicle by generating a remote control signal according to the calculated driving route.

The lead vehicle may receive driving information corresponding to a change in a relative position of the droid vehicle on the driving route from the droid vehicle, and may remotely control driving of the droid vehicle in consideration of the driving information.

The lead vehicle may include a first battery, the droid vehicle may include a second battery, and when the lead vehicle is coupled to the droid vehicle, the lead vehicle may control at least one of sharing, charging, and using electrical energy between the first and second batteries.

When the droid vehicle is coupled to the lead vehicle, the droid vehicle may be moved by power based on the first battery or may support power based on the second battery.

When the droid vehicle supports power based on the second battery, the droid vehicle may support direction rotation based on a rotational speed difference between two wheels or may support movement speed control by increasing or decreasing rotational speed of the wheels.

The droid vehicle may be automatically coupled to or released from the lead vehicle in at least one form of a trailer form and a train form using a coupler.

In accordance with another aspect of the present invention, provided is a method of providing a delivery service using autonomous vehicles, wherein the method provides a delivery service on an irregular road where entry of normal vehicles is not allowed and a regular road where entry of small and low-speed vehicles is not allowed and includes a step of, by a lead vehicle, providing a delivery service based on autonomous driving on the regular road while transporting a droid vehicle by being coupled to the droid vehicle on the regular road; a step of, by the lead vehicle, remotely controlling driving of the droid vehicle after the lead vehicle is separated from the droid vehicle in a last mile delivery section corresponding to the irregular road; and a step of, by the droid vehicle, providing a delivery service in the last mile delivery section based on the remote control driving.

The step of providing a delivery service based on autonomous driving on the regular road while transporting a droid vehicle by being coupled to the droid vehicle on the regular road may include a step of recognizing a relative location of the droid vehicle when coupled to the droid vehicle and selectively driving first multiple sensors of the lead vehicle and second multiple sensors of the droid vehicle in a distributed manner based on the recognized relative location to collect integrated sensor data; a step of recognizing all directions for the coupled state between the lead vehicle and the droid vehicle based on the collected integrated sensor data; and a step of performing autonomous driving on the regular road based on the recognized all directions.

The step of recognizing all directions for the coupled state between the lead vehicle and the droid vehicle based on the collected integrated sensor data may include a step of processing some of the integrated sensor data using a first processor of the lead vehicle; and a step of transmitting the remaining data except for the partial data to the droid vehicle and processing the partial data using a second processor of the droid vehicle.

The step of remotely controlling driving of the droid vehicle after the lead vehicle is separated from the droid vehicle in a last mile delivery section corresponding to the irregular road may include a step of calculating a position and an initial position of the droid vehicle using the first multiple sensors of the lead vehicle; a step of calculating a final position of the droid vehicle using the calculated initial position and second multiple sensors-based second sensor data transmitted from the droid vehicle; a step of applying the calculated final position to precision map information to calculate a driving route to a destination where the delivery service is provided; and a step of detecting surroundings at the calculated final position using the second sensor data and remotely controlling driving of the droid vehicle in consideration of the detected surroundings and the calculated driving route.

The step of remotely controlling driving of the droid vehicle in consideration of the detected surroundings and the calculated driving route may include a step of receiving driving information corresponding to a change in a relative position of the droid vehicle on the driving route from the droid vehicle and remotely controlling driving of the droid vehicle in consideration of the driving information.

Advantageous Effects

The present invention can provide a system and method for providing a delivery service using autonomous vehicles in which, on a regular road, a lead vehicle and at least one droid vehicle are coupled to each other and a delivery service is provided based on autonomous driving; and on an irregular road, the coupling between the lead vehicle and the droid vehicle is automatically released and the droid vehicle provides a delivery service by remotely controlling the driving of the droid vehicle by the lead vehicle in the last mile delivery section corresponding to the irregular road.

The present invention can a system and method for providing a delivery service using autonomous vehicles that are capable of, in an autonomous driving logistics delivery service, responding to two driving environments in a mixed condition of a section where the traffic laws is applied to a place where the movement of ultra-small vehicles and low-speed mobility is not permitted and a last mile section where entry of general vehicles is not allowed.

The present invention can integrally collect sensor data of a lead vehicle and sensor data of a droid vehicle in consideration of the arrangement position of sensors in a structure in which the lead vehicle and the droid vehicle are mutually coupled and can efficiently reduce the cost required for constructing computing resources by distributing and processing the collected sensor data using the processor of the lead vehicle and the processor of the droid vehicle.

The present invention can overcome limitations in constructing an autonomous driving environment for a droid vehicle and improve autonomous driving performance of the droid vehicle by remotely controlling the droid vehicle after the droid vehicle is separated from a lead vehicle.

The present invention can improve the efficiency of resource consumption based on a cooperative structure between an autonomous vehicle and an autonomous droid by mutually sharing physical resources such as sensors, batteries, and processors of the lead vehicle and the droid vehicle in a coupling structure between the lead vehicle and the droid vehicle.

BEST MODE

Figure 1:
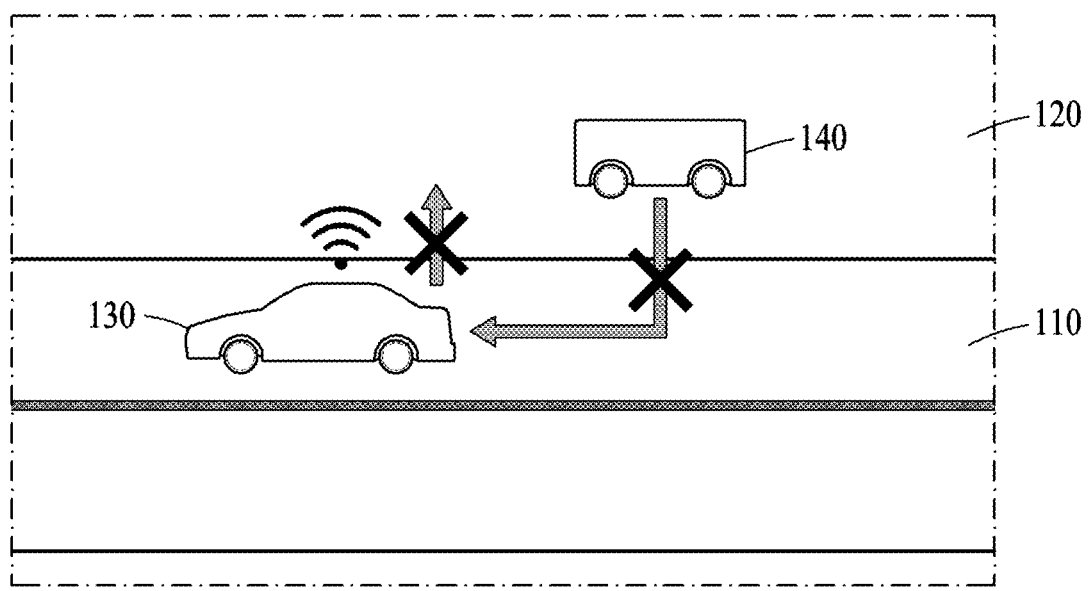
FIG. 1 is a diagram for explaining an operable region of a conventional autonomous vehicle and autonomous driving mobility.

Specific structural and functional descriptions of embodiments according to the concept of the present invention disclosed herein are merely illustrative for the purpose of explaining the embodiments according to the concept of the present invention. Furthermore, the embodiments according to the concept of the present invention can be implemented in various forms and the present invention is not limited to the embodiments described herein.

The embodiments according to the concept of the present invention may be implemented in various forms as various modifications may be made. The embodiments will be described in detail herein with reference to the drawings. However, it should be understood that the present invention is not limited to the embodiments according to the concept of the present invention, but includes changes, equivalents, or alternatives falling within the spirit and scope of the present invention.

It should be understood that, although the terms first, second, third etc. may be used herein to describe various elements, these elements should not be limited by these terms. These terms are only used to distinguish one element from another element. For example, a first element may be termed a second element and a second element may be termed a first element without departing from the teachings of the present invention.

It should be understood that when an element is referred to as being "connected to" or "coupled to" another element, the element may be directly connected or coupled to the other element or intervening elements may be present. In contrast, when an element is referred to as being "directly connected to" or "directly coupled to" another element, there are no intervening elements present. Other words used to describe the relationship between elements or layers should be interpreted in a like fashion (e.g., "between," versus "directly between," "adjacent," versus "directly adjacent," etc.).

The terms used in the present specification are used to explain a specific exemplary embodiment and not to limit the present inventive concept. Thus, the expression of singularity in the present specification includes the expression of plurality unless clearly specified otherwise in context. Also, terms such as "include" or "comprise" should be construed as denoting that a certain characteristic, number, step, operation, constituent element, component or a combination thereof exists and not as excluding the existence of or a possibility of an addition of one or more other characteristics, numbers, steps, operations, constituent elements, components or combinations thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments of the present invention will be described in detail with reference to the accompanying drawings. However, the scope of the present invention is not limited by these embodiments. Like reference numerals in the drawings denote like elements.

Figure 2:
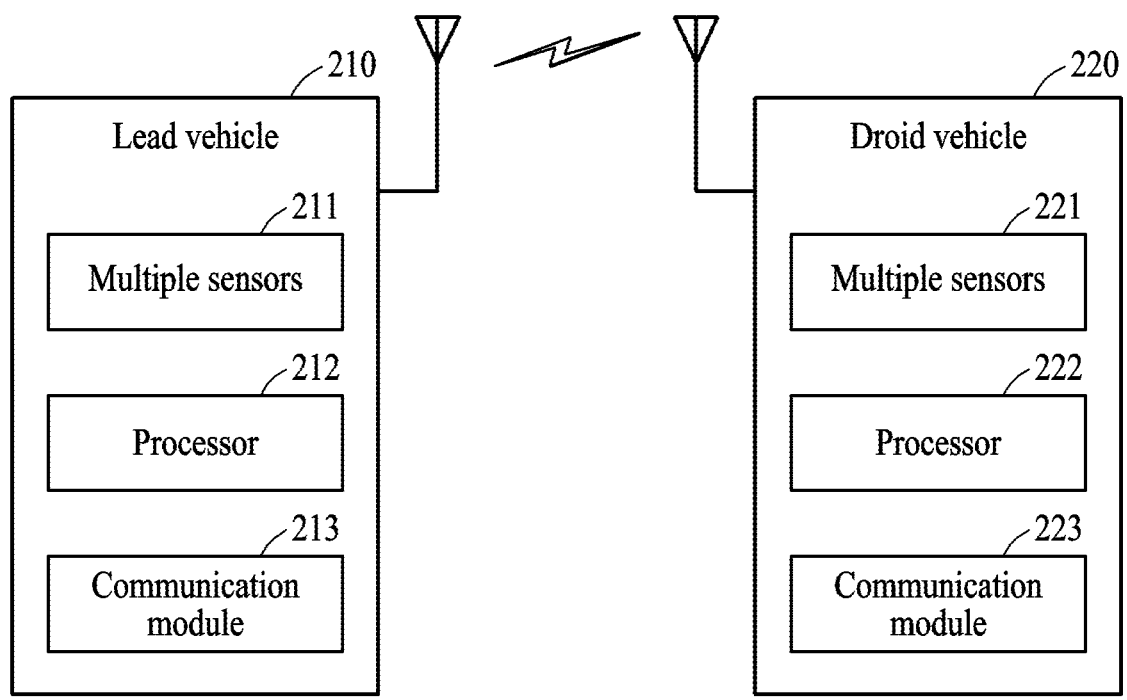
FIG. 2 is a block diagram for explaining a system for providing a delivery service using autonomous vehicles according to one embodiment of the present invention.

FIG. 2 is a block diagram for explaining a system for providing a delivery service using autonomous vehicles according to one embodiment of the present invention.

FIG. 2 illustrates the components of the system for providing a delivery service using autonomous vehicles according to one embodiment of the present invention.

Referring to FIG. 2, the system 200 for providing a delivery service using autonomous vehicles according to one embodiment of the present invention consists of a lead vehicle 210 and droid vehicles 220.

For example, the droid vehicles 220 are small autonomous vehicles with limited autonomous driving performance coupled to the lead vehicle 210.

In addition, a plurality of droid vehicles 220 may be configured within a controllable range by the lead vehicle 210.

The system 200 for providing a delivery service using autonomous vehicles according to one embodiment of the present invention may provide a delivery service on an irregular road where entry of normal vehicles is not allowed and on a regular road where entry of small and low-speed vehicles is not allowed.

According to one embodiment of the present invention, the lead vehicle 210 may be referred to as at least one of a main delivery vehicle, a first delivery vehicle, a first transport vehicle, a first autonomous delivery vehicle, a fully autonomous vehicle, and a first autonomous vehicle.

In addition, the droid vehicle 220 may be referred to as at least one of an auxiliary delivery vehicle, a second delivery vehicle, a second transport vehicle, a second autonomous delivery vehicle, an auxiliary autonomous vehicle, and a second autonomous vehicle.

According to one embodiment of the present invention, the lead vehicle 210 includes multiple sensors 211, a processor 212, and a communication module 213.

The lead vehicle 210 may use the multiple sensors 211 to perform autonomous driving or recognize the location of the lead vehicle 210 and the location of the droid vehicles 220.

For example, the lead vehicle 210 may use the processor 212 to process sensor data collected by the multiple sensors 211, process data received from the droid vehicles 220, control operation of the lead vehicle 210 according to a coupling structure or decoupling structure with the droid vehicles, and perform remote control of the droid vehicles 220.

According to one embodiment of the present invention, the lead vehicle 210 may use the communication module 213 to transmit a remote control signal to the droid vehicles 220 and receive sensor data from the droid vehicles 220.

For example, the multiple sensors 211 may be referred to as first multiple sensors and may include a plurality of sensors that sense the state of the lead vehicle 210.

According to one embodiment of the present invention, the multiple sensors 211 may include at least one posture sensor of a yaw sensor, a roll sensor, a pitch sensor, a crash sensor, a wheel sensor, a speed sensor, an inclination sensor, a weight detection sensor, a heading sensor, a yaw sensor, a gyro sensor, a position module, a vehicle forward/reverse sensor, a battery sensor, a fuel sensor, a tire sensor, a steering sensor by steering wheel rotation, a vehicle interior temperature sensor, a vehicle interior humidity sensor, an ultrasonic sensor, a light sensor, an accelerator pedal position sensor, and a brake pedal position sensor.

In addition, the multiple sensors 211 may obtain at least one sensing signal for vehicle posture information, vehicle collision information, vehicle direction information, vehicle location (GPS) information, vehicle angle information, vehicle speed information, vehicle acceleration information, vehicle tilt information, vehicle forward/reverse information, battery information, fuel information, tire information, vehicle lamp information, vehicle interior temperature information, vehicle interior humidity information, steering wheel rotation angle, vehicle exterior illuminance, pressure applied to an accelerator pedal, pressure applied to a brake pedal, or the like.

In addition, the multiple sensors 211 may further include at least one sensor of an accelerator pedal sensor, a pressure sensor, an engine rotation speed sensor, an air flow sensor (AFS), an intake temperature sensor (ATS), a water temperature sensor (WTS), a throttle position sensor (TPS), a TDC sensor, and a crank angle sensor (CAS).

According to one embodiment of the present invention, each of the droid vehicles 220 includes multiple sensors 221, a processor 222, and a communication module 223.

For example, the multiple sensors 221 may be referred to as second multiple sensors, and the processor 222 may be referred to as a second processor.

The droid vehicles 220 may use the multiple sensors 221 to perform limited autonomous driving or recognize the location of the lead vehicle 210, the relative location of the droid vehicles 220, and surroundings.

According to one embodiment of the present invention, the droid vehicles 220 may use the communication module 223 to receive a remote control signal from the lead vehicle 210 or transmit sensor data to the lead vehicle 210.

According to one embodiment of the present invention, among the multiple sensors 211 described above, the multiple sensors 221 may selectively include a sensor for maintaining autonomous driving performance of the droid vehicles 220.

According to one embodiment of the present invention, the lead vehicle 210 may provide a delivery service based on autonomous driving on regular roads, may transport the droid vehicles 220 by being coupled to the droid vehicles 220 on regular roads, and may remotely control driving of the droid vehicles 220 after disconnection from the droid vehicles 220 in a last mile delivery section.

For example, when the lead vehicle 210 is coupled to the droid vehicles 220, the first multiple sensors and the second multiple sensors may be selectively driven in a distributed manner to recognize all directions of the coupled state between the lead vehicle and the droid vehicles 220, and autonomous driving may be performed on regular roads based on recognized all directions.

According to one embodiment of the present invention, when the lead vehicle 210 is coupled to the droid vehicles 220, the relative location of the droid vehicles 220 may be recognized, and the first multiple sensors and the second multiple sensors may be selectively driven in a distributed manner based on the recognized relative location to collect integrated sensor data.

In addition, when the lead vehicle 210 is coupled to the droid vehicles 220, some data of integrated sensor data may be processed using the first process, and at the same time, the remaining data except for the partial data may be transferred to the droid vehicles 220 and the remaining data may be processed using the second processor.

That is, when the lead vehicle 210 is coupled to the droid vehicles 220, integrated sensor data may be collected by minimizing an overlapping area between the first sensor data and the second sensor data.

Accordingly, the present invention may integrally collect sensor data of a lead vehicle and sensor data of a droid vehicle in consideration of the arrangement position of sensors in a structure in which the lead vehicle and the droid vehicle are mutually coupled and may efficiently reduce the cost required for constructing computing resources by distributing and processing the collected sensor data using the processor of the lead vehicle and the processor of the droid vehicle.

According to one embodiment of the present invention, in a last mile section where the lead vehicle 210 is difficult to enter, the lead vehicle 210 may release the coupling between the lead vehicle 210 and the droid vehicles 220 and may remotely controls the autonomous driving of the droid vehicles 220.

Specifically, the lead vehicle 210 calculates a position using the first multiple sensors, calculates the initial position of the droid vehicles 220 using the first multiple sensors, and calculates the final position of the droid vehicles 220 using the calculated initial position and second multiple sensors-based second sensor data transmitted from the droid vehicles 220.

In addition, the lead vehicle 210 may detect surroundings at the final position calculated using the second sensor data, and may remotely control the driving of the droid vehicles 220 in consideration of the detected surroundings.

In addition, the lead vehicle 210 may calculate a driving route to a destination where a delivery service is provided by applying the calculated final position to precision map information, and may generate a remote control signal according to the calculated driving route to remotely control the driving of the droid vehicles.

In addition, after the droid vehicles 220 complete a delivery service, the lead vehicle 210 may perform remote control so that the droid vehicles 220 return to the location of the lead vehicle 210 from the destination.

In addition, the lead vehicle 210 may receive driving information corresponding to a change in the relative position of the droid vehicles 220 on the driving route from the droid vehicles 220, and may remotely control the driving of the droid vehicles 220 in consideration of the driving information.

For example, the system 200 for providing a delivery service using autonomous vehicles according to one embodiment of the present invention may provide a method of providing a delivery service using autonomous vehicles in which a delivery service is provided on an irregular road where entry of normal vehicles is not allowed and a regular road where entry of small and low-speed vehicles is not allowed.

According to one embodiment of the present invention, the method of providing a delivery service using autonomous vehicles may include a step of, by a lead vehicle, providing a delivery service based on autonomous driving on a regular road while transporting droid vehicles by being coupled to the droid vehicles on the regular road, a step of, by the lead vehicle, remotely controlling the driving of the droid vehicles after the lead vehicle is separated from the droid vehicles in a last mile delivery section corresponding to an irregular road, and a step of, by the droid vehicles, providing a delivery service in the last mile delivery section based on remote control driving.

In addition, according to one embodiment of the present invention, the method of providing a delivery service using autonomous vehicles may include a step of recognizing the relative location of the droid vehicles when the lead vehicle is coupled to the droid vehicles and selectively driving the first multiple sensors of the lead vehicle and the second multiple sensors of the droid vehicles in a distributed manner based on the recognized relative location to collect integrated sensor data, a step of recognizing all directions for the coupled state between the lead vehicle and the droid vehicles based on the collected integrated sensor data, and a step of performing autonomous driving on the regular road based on the recognized all directions.

In addition, according to one embodiment of the present invention, the method of providing a delivery service using autonomous vehicles may include a step of processing some data of integrated sensor data using the first processor of the lead vehicle and a step of transmitting the remaining data except for the partial data to the droid vehicles and processing the remaining data using the second processor of the droid vehicles.

In addition, according to one embodiment of the present invention, the method of providing a delivery service using autonomous vehicles may include a step of calculating a position and the initial position of the droid vehicles using the first multiple sensors of the lead vehicle, a step of calculating the final position of the droid vehicles using the calculated initial position and second multiple sensors-based second sensor data transmitted from the droid vehicles, a step of calculating a driving route to a destination where a delivery service is provided by applying the calculated final position to precision map information, and a step of detecting surroundings at the final position calculated using the second sensor data and remotely controlling the driving of the droid vehicles in consideration of the detected surroundings and the calculated driving route.

Accordingly, the present invention may provide a system and method for providing a delivery service using autonomous vehicles in which, on a regular road, a lead vehicle and at least one droid vehicle are coupled to each other and a delivery service is provided based on autonomous driving; and on an irregular road, the coupling between the lead vehicle and the droid vehicle is automatically released and the droid vehicle provides a delivery service by remotely controlling the driving of the droid vehicle by the lead vehicle in the last mile delivery section corresponding to the irregular road.

FIG. 3A to FIG. 5 are diagrams for explaining a coupling structure between a lead vehicle and droid vehicles in the system for providing a delivery service using autonomous vehicles according to one embodiment of the present invention.

Figure 3A:
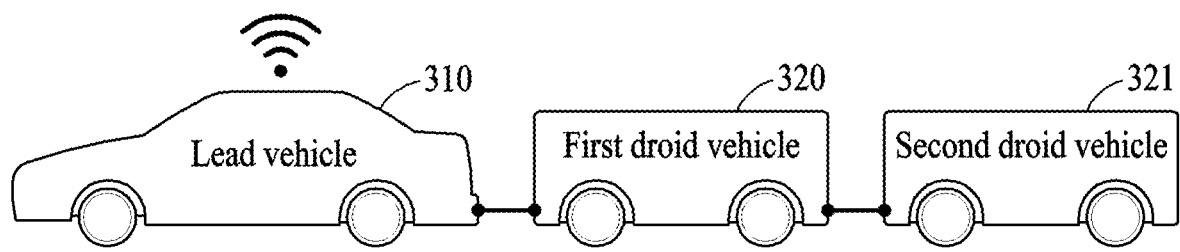
FIG. 3A to FIG. 5 are diagrams for explaining a coupling structure between a lead vehicle and droid vehicles in a system for providing a delivery service using autonomous vehicles according to one embodiment of the present invention.

FIG. 3A illustrates a case in which a plurality of droid vehicles is coupled to a lead vehicle and the droid vehicles have a four-wheeled structure in the system for providing a delivery service using autonomous vehicles according to one embodiment of the present invention.

Referring to FIG. 3A, the system 300 for providing a delivery service using autonomous vehicles according to one embodiment of the present invention may consist of a lead vehicle 310, a first droid vehicle 320, and a second droid vehicle 330, and the number of droid vehicles may be increased or decreased.

According to one embodiment of the present invention, the lead vehicle 310 may be a vehicle capable of high-speed autonomous driving on a regular road with upper and lower speed limits, may play the role of transporting delivery droid mobility between medium and long-distance regular road sections, and may perform autonomous driving delivery services alone.

For example, the first and second droid vehicles 320 and 330 may be mobile small vehicles or mobility platforms with magnetic power that perform delivery in the last mile section. The system may be configured such that the first and second droid vehicles 320 and 330 have relatively limited autonomous driving performance (autonomy) compared to the lead vehicle 310.

In addition, the first and second droid vehicles 320 and 330 may perform remote autonomous driving by using the performance of the autonomous driving system of the lead vehicle 310 while remotely communicating with the lead vehicle 310.

That is, by the lead vehicle 310, the first and second droid vehicles 320 and 330 may perform remotely controlled autonomous driving in the last mile section.

Figure 3B:
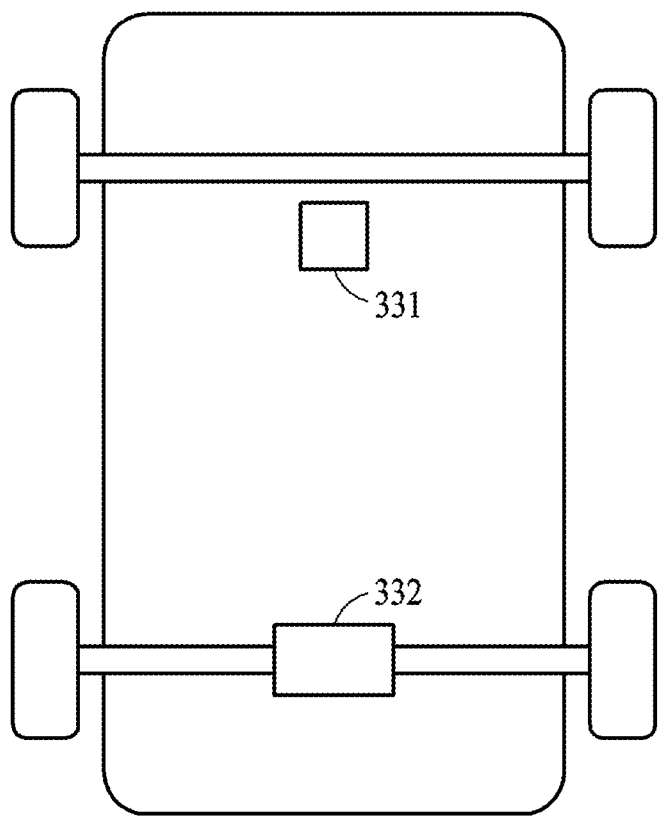

FIG. 3B illustrates a wheel structure and motor structure of a droid vehicle according to one embodiment of the present invention.

Referring to FIG. 3B, a droid vehicle 330 according to one embodiment of the present invention includes a steering motor 331 capable of assisting turning and a driving motor 332 capable of assisting movement speed.

Accordingly, the droid vehicle 330 according to one embodiment of the present invention may support directional rotation by generating a rotational speed difference between two wheels based on the steering motor 331.

In addition, the droid vehicle 330 according to one embodiment of the present invention may support movement speed control by increasing or decreasing the rotational speed of the wheels based on the driving motor 332.

Figure 4A:
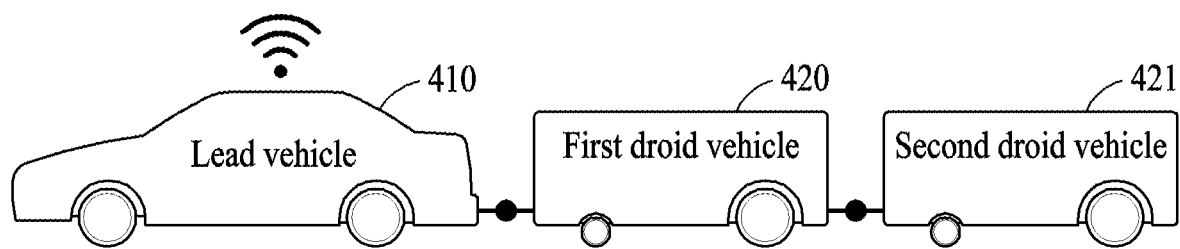

FIG. 4A illustrates a case in which a plurality of droid vehicles is coupled to a lead vehicle and the droid vehicles have a trailer structure in the system for providing a delivery service using autonomous vehicles according to one embodiment of the present invention.

Referring to FIG. 4A, the system 400 for providing a delivery service using autonomous vehicles according to one embodiment of the present invention may consist of a lead vehicle 410, a first droid vehicle 420, and a second droid vehicle 430, and the number of the droid vehicles may be increased or reduced.

According to one embodiment of the present invention, the lead vehicle 410 may be a vehicle capable of high-speed autonomous driving on a regular road with upper and lower speed limits, may play the role of transporting delivery droid mobility between medium and long-distance regular road sections, and may perform autonomous driving delivery services alone.

For example, the first and second droid vehicles 420 and 430 may be mobile small vehicles or mobility platforms with magnetic power that perform delivery in the last mile section. The system may be configured such that the first and second droid vehicles 420 and 430 have relatively limited autonomous driving performance (autonomy) compared to the lead vehicle 410.

In addition, the first and second droid vehicles 420 and 430 may perform remote autonomous driving by using the performance of the autonomous driving system of the lead vehicle 410 while remotely communicating with the lead vehicle 410.

That is, by the lead vehicle 410, the first and second droid vehicles 420 and 430 may perform remotely controlled autonomous driving in the last mile section.

Figure 4B:
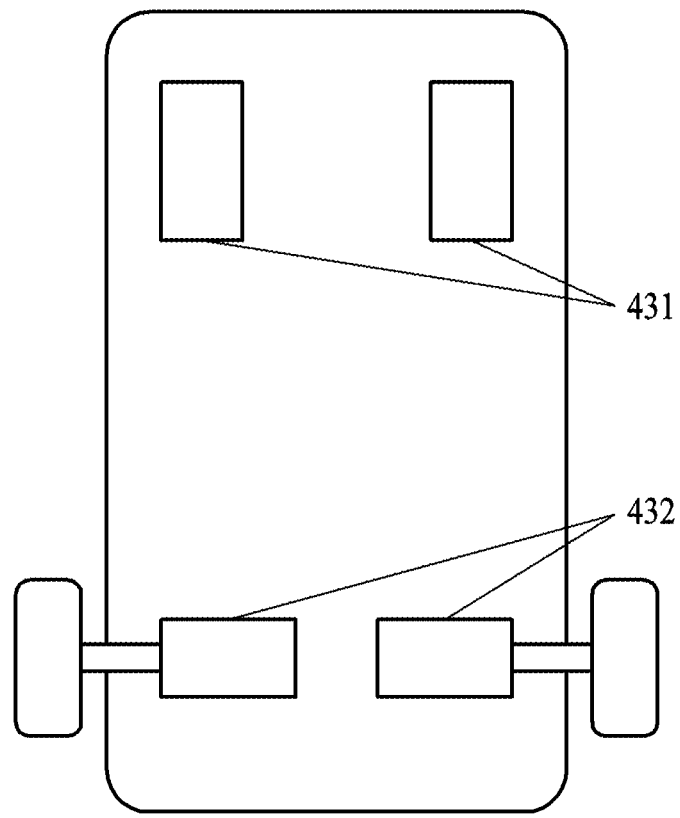

FIG. 4B illustrates a wheel structure and motor structure of the droid vehicle according to one embodiment of the present invention.

Referring to FIG. 4B, a droid vehicle 430 according to one embodiment of the present invention includes a caster 431 for supporting horizontal rotation and movement by driving and a driving motor 432 capable of supporting movement speed.

Accordingly, the droid vehicle 430 according to one embodiment of the present invention may support movement speed control by increasing or decreasing the rotational speed of the wheels based on the driving motor 432.

Figure 5:
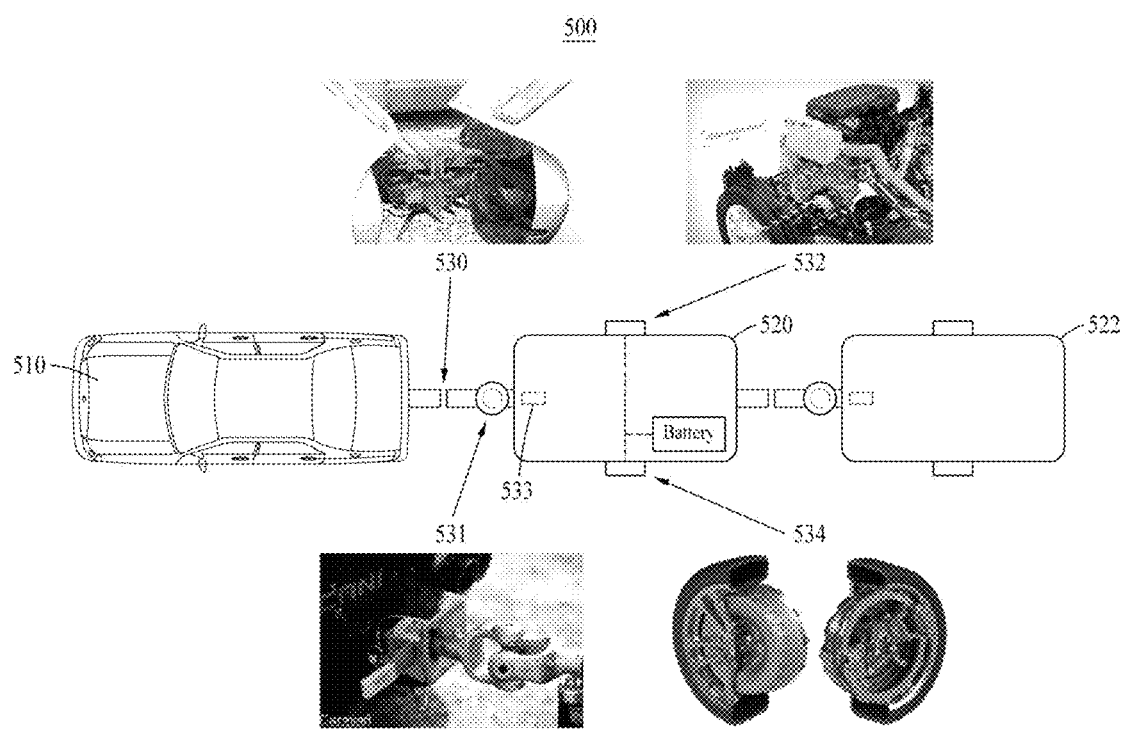

FIG. 5 illustrates a coupling structure between a lead vehicle and droid vehicles in the system for providing a delivery service using autonomous vehicles according to one embodiment of the present invention.

Referring to FIG. 5, the system 500 for providing a delivery service using autonomous vehicles according to one embodiment of the present invention may consist of a lead vehicle 510, a first droid vehicle 520, and a second droid vehicle 522. The lead vehicle 510 and the first droid vehicle 520 are coupled to each other, and the first and second droid vehicles 520 and 522 are coupled to each other.

Here, the coupling structure between the lead vehicle 510 and the first droid vehicle 520 is specifically exemplified, and the same coupling structure is possible between the droid vehicles.

According to one embodiment of the present invention, the lead vehicle 510 is coupled to the first droid vehicle 520 using an automatic coupler 530.

That is, the lead vehicle 510 or the first droid vehicle 520 may be automatically coupled to or released from the first droid vehicle 520 or the lead vehicle 510 in at least one form of a trailer form and a train form using the automatic coupler 530 corresponding to the coupler.

For example, when droid vehicles are driven on general roads (city road, car-only road, highway, etc.), the droid vehicles may be driven in a coupled state like a trailer vehicle. In addition, when two or more droid vehicles are coupled, the droid vehicles may be driven like a train.

A refraction angle sensor 531 may be attached to a portion coupled by the automatic coupler 530. Due to this configuration, the relative locations of the lead vehicle 510 and the first droid vehicle 520 may be estimated. For example, a universal joint may be located at the joint.

Here, a location measurement device such as GPS may not be installed in the first droid vehicle 520.

In addition, a caster 533 may be disposed on the first droid vehicle 520 to support movement of the first droid vehicle 520.

In addition, a regenerative braking system 532 may be disposed on the wheels of the first droid vehicle 520. Like an in-wheel system 534, by attaching a motor directly to the wheel, the direction may be changed or the vehicle speed may be controlled by the difference in rotational speed of the two wheels.

Accordingly, in the first droid vehicle 520, a battery may be charged based on the regenerative braking system 532. In addition, when the first droid vehicle 520 is coupled to the lead vehicle 510, electricity may be shared by interconnecting batteries through wires.

That is, the lead vehicle 510 may include a first battery, and the first droid vehicle 520 may include a second battery. When the lead vehicle 510 is coupled to the first droid vehicle 520, the lead vehicle 510 may control at least one of sharing, charging, and using electric energy between the first and second batteries.

In addition, when the first droid vehicle 520 is coupled to the lead vehicle 510, the first droid vehicle 520 may move according to rotation of the caster 533 using power based on the first battery of the lead vehicle 510 or may support power by driving the in-wheel system 534 based on the second battery.

Figure 6:
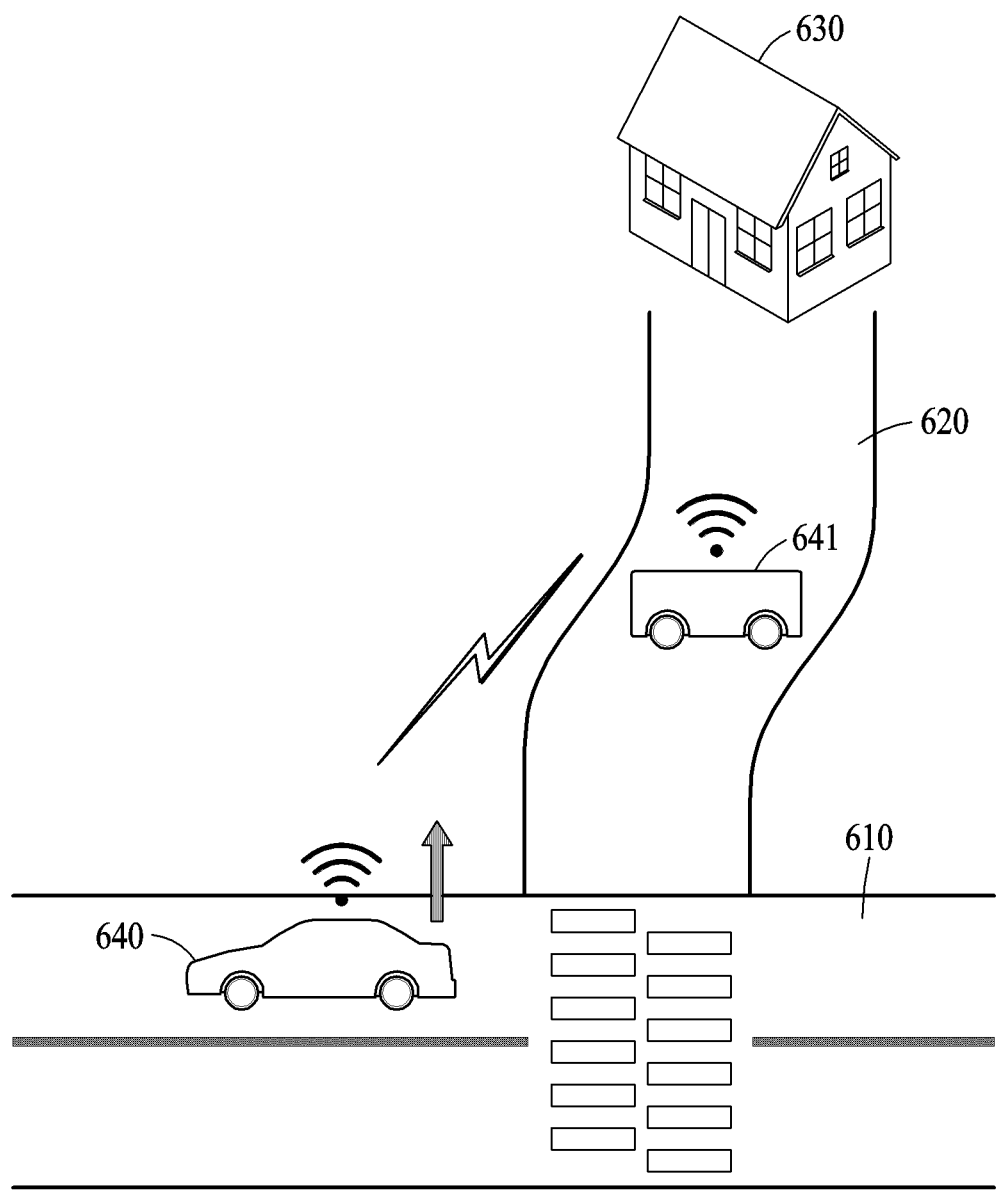
FIG. 6 is a diagram for explaining a system for providing a delivery service using autonomous vehicles that remotely controls a droid vehicle in a last mile section according to one embodiment of the present invention.

FIG. 6 is a diagram for explaining the system for providing a delivery service using autonomous vehicles that remotely controls a droid vehicle in a last mile section according to one embodiment of the present invention.

Referring to FIG. 6, in the system for providing a delivery service using autonomous vehicles according to one embodiment of the present invention, in a delivery environment 600 composed of a regular road 610 and an irregular road 620, when a destination 630 is accessible through the irregular road 620, a lead vehicle 640 may be separated from a droid vehicle 641 on the regular road 610, and a delivery service may be provided to the destination 630 on the irregular road 620 by remotely controlling the separated droid vehicle 641.

That is, in the system for providing a delivery service using autonomous vehicles according to one embodiment of the present invention, by remotely controlling the droid vehicle 641 to approach the destination 630 on the irregular road 620, which the lead vehicle 640 cannot access, a delivery service may be provided on both the regular road 610 and the irregular road 620.

In addition, in the system for providing a delivery service using autonomous vehicles according to one embodiment of the present invention, in the last mile section, when the driving of the droid vehicle 641 is controlled through remote communication between the lead vehicle 640 and the droid vehicle 641, when the droid vehicle 641 is equipped with a system resource that supports high-performance autonomous driving function, problems such as high manufacturing costs of the droid vehicle 641, excessive power consumption for system operation, and spatial limitations due to the compact structure with insufficient mounting space for sensors may be solved.

In general, in order for the droid vehicle 641 to perform fully autonomous driving by itself, the droid vehicle 641 must have an autonomous driving function structure that recognizes and detects all directions. However, by using the autonomous driving function of the lead vehicle 640 and receiving necessary information remotely from the lead vehicle 640, the droid vehicle 641 having a partial autonomous driving function may perform autonomous driving.

For this function, the lead vehicle 640 and each droid vehicle 641 are individually equipped with a wireless communication module (4G LTE, 5G, WIFI, etc.), and the lead vehicle 640 may receive sensor data and driving data from the droid vehicle 641 in real time through a wireless network.

Accordingly, the present invention may provide a system and method for providing a delivery service using autonomous vehicles that are capable of, in an autonomous driving logistics delivery service, responding to two driving environments in a mixed condition of a section where the traffic laws is applied to a place where the movement of ultra-small vehicles and low-speed mobility is not permitted and a last mile section where entry of general vehicles is not allowed.

Figure 7:
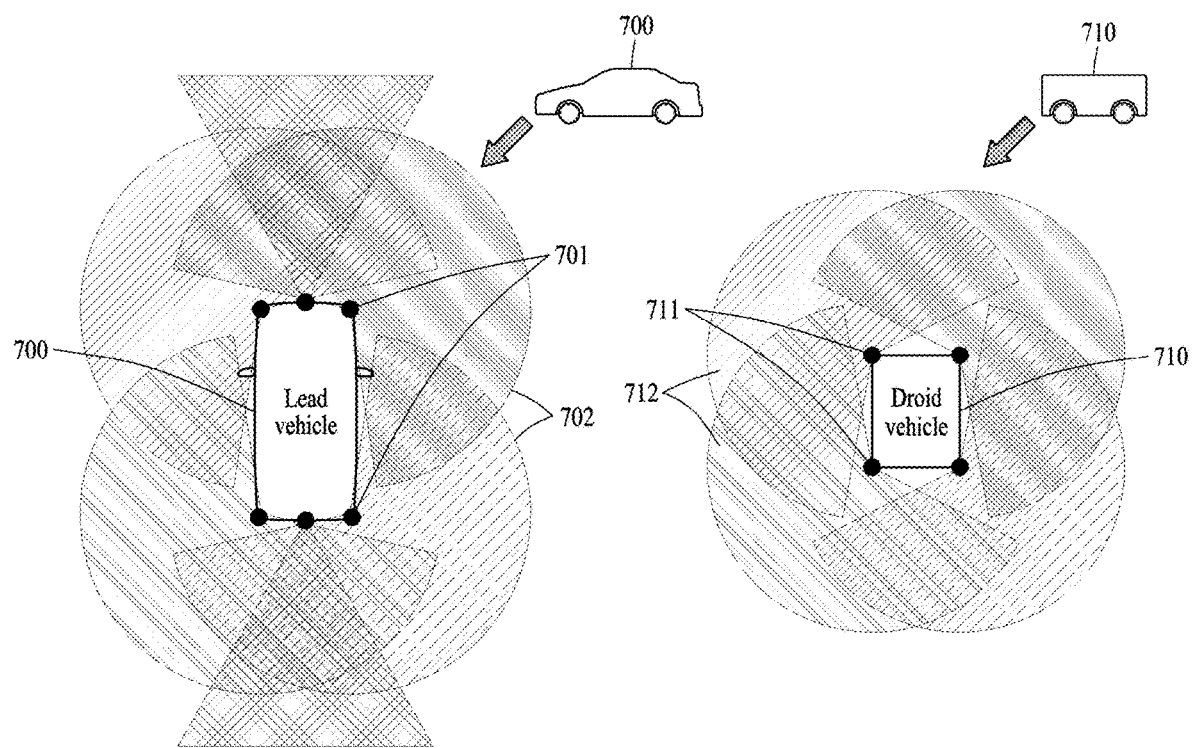
FIGS. 7 and 8 are diagrams for explaining multi-sensor driving in a system for providing a delivery service using autonomous vehicles according to one embodiment of the present invention.
Figure 8:
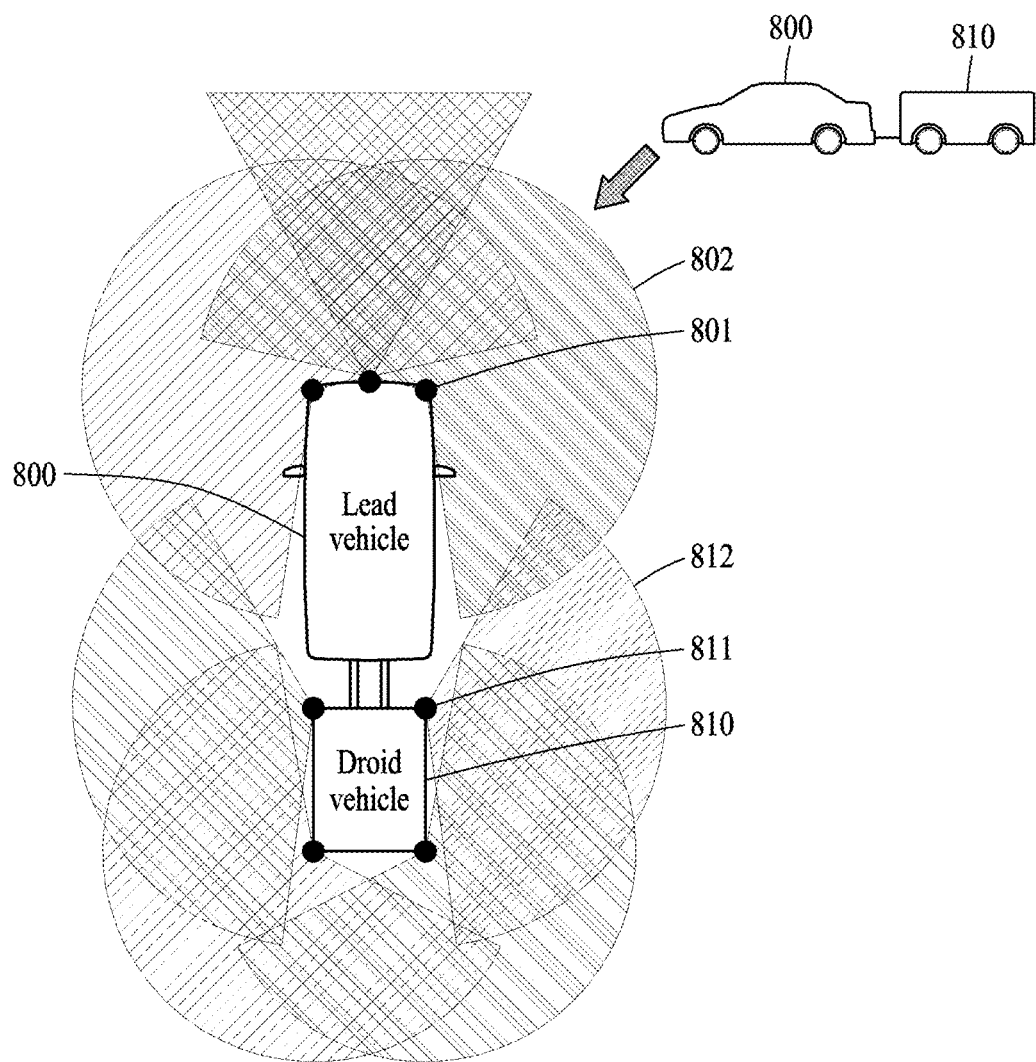

FIGS. 7 and 8 are diagrams for explaining multi-sensor driving in the system for providing a delivery service using autonomous vehicles according to one embodiment of the present invention.

FIG. 7 illustrates multi-sensor driving when a lead vehicle and a droid vehicle are separated in the system for providing a delivery service using autonomous vehicles according to one embodiment of the present invention.

Referring to FIG. 7, a lead vehicle 700 and a droid vehicle 710 may be separated, and the lead vehicle 700 may form a view angle area 702 in all directions using multiple sensors 701 to perform autonomous driving.

In addition, the droid vehicle 710 may also perform limited autonomous driving by forming a view angle area 712 in all directions using multiple sensors 711.

That is, the lead vehicle 700 must have a sensor system for a fully autonomous driving function, and the droid vehicle 710 is also equipped with a sensor for a limited autonomous driving function required for last mile section driving.

In addition, when the coupling mode with the droid vehicle 710 is not considered, the lead vehicle 700 must recognize surrounding objects in all directions around the vehicle for autonomous driving. In this case, it is necessary to arrange necessary sensors (camera, lidar, radar, etc.) to have complete coverage.

FIG. 8 illustrates multi-sensor driving when a lead vehicle and a droid vehicle are coupled to each other in the system for providing a delivery service using autonomous vehicles according to one embodiment of the present invention.

Referring to FIG. 8, a lead vehicle 800 and a droid vehicle 810 may be coupled to each other, and the lead vehicle 800 and the droid vehicle 810 may perform autonomous driving by selectively using multiple sensors 801 and multiple sensors 811 to form a view angle area 802 and a view angle area 812 in all directions.

That is, when the lead vehicle 800 and the droid vehicle 810 are coupled to each other, by distributing and arranging the sensor systems mounted on each platform of the lead vehicle 800 and the droid vehicle 810 to be suitable for mutually bound mode to recognize the driving environment of the autonomous driving car, the same function may be performed using a smaller number of sensors than sensors used when configuring a sensor system for each vehicle.

In a mode in which the lead vehicle 800 and the droid vehicle 810 are coupled to each other, costs for driving sensors may be minimized by selectively driving sensors mounted on the lead vehicle 800 and the droid vehicle 810 without overlapping.

That is, in the mode in which the lead vehicle 800 and the droid vehicle 810 are coupled to each other, sensors mounted on the droid vehicle 810 may replace the function of the side and rear sensors of the lead vehicle 800.

In addition, in the mode in which the lead vehicle 800 and the droid vehicle 810 are coupled to each other, since the relative position of the droid vehicle 810 is accurately determined by the lead vehicle 800, sensors for selectively collecting sensor data among multiple sensors of the lead vehicle 800 and the droid vehicle 810 may be selectively driven.

In addition, when the droid vehicle 810 accurately recognizes a wheel center position, whether or not the droid vehicle 810 collides with a nearby vehicle may be determined, and avoidance driving may be performed.

That is, the present invention may improve the efficiency of resource consumption based on a cooperative structure between an autonomous vehicle and an autonomous droid by mutually sharing physical resources such as sensors, batteries, and processors of the lead vehicle and the droid vehicle in a coupling structure between the lead vehicle and the droid vehicle.

In addition, according to the present invention, in a structure in which the lead vehicle and the droid vehicle are coupled to each other, sensor data of the lead vehicle and sensor data of the droid vehicle may be collected integrally in consideration of arrangement of the sensors.

Figure 9:
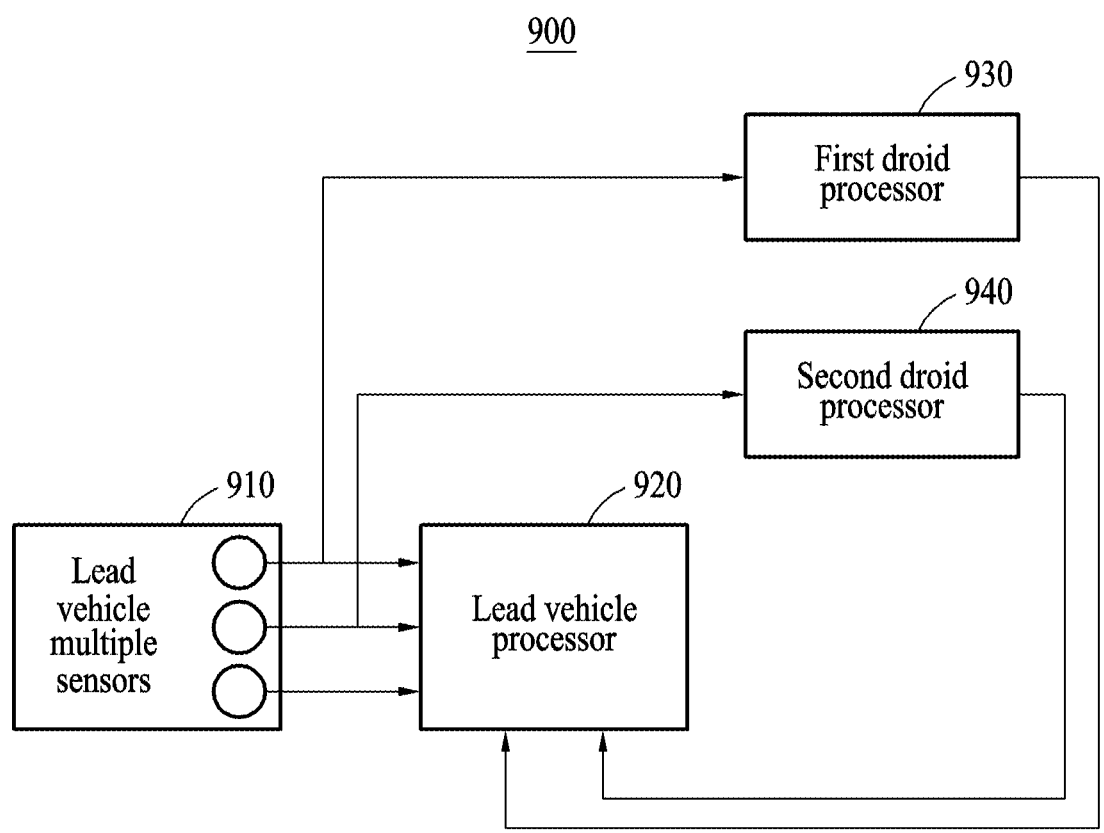
FIG. 9 is a diagram explaining the configuration of distributed processing of sensor data of multiple sensors in a system for providing a delivery service using autonomous vehicles according to one embodiment of the present invention.

FIG. 9 is a diagram explaining the configuration of distributed processing of sensor data of multiple sensors in the system for providing a delivery service using autonomous vehicles according to one embodiment of the present invention.

Referring to FIG. 9, the system 900 for providing a delivery service using autonomous vehicles according to one embodiment of the present invention consists of a lead vehicle, a first droid vehicle, and a second droid vehicle.

For example, the lead vehicle includes lead vehicle multiple sensors 910 and a lead vehicle processor 920.

In addition, the first droid vehicle includes a first droid processor 930, and the second droid vehicle includes a second droid processor 940.

According to one embodiment of the present invention, the lead vehicle may process sensor data collected by the lead vehicle multiple sensors 910 using the lead vehicle processor 920. At the same time, the lead vehicle may transmit the sensor data to the first and second droid vehicles, and the sensor data may be processed using the first and second droid processors 930 and 940.

Here, an embodiment of performing processing using multiple sensors of the lead vehicle is described. In addition to the multiple sensors of the lead vehicle, using the multiple sensors of the droid vehicle, collected integrated sensor data may be processed using the lead vehicle processor 920, the first droid processor 930, and the second droid processor 940.

For example, when system computing resources (processor, memory, etc.) required to process autonomous driving sensor data independently in the lead vehicle are distributed to each droid vehicle, the cost required to build a lead vehicle computing resource may be effectively reduced.

For example, a structure in which the lead vehicle and the droid vehicle are mutually bound and batteries mounted on the lead vehicle and the droid vehicle mutually shares power consumption required for operation of the high-performance autonomous driving system during movement may be included.

In addition, in the mutually coupled lead vehicle and droid vehicle, to increase the bandwidth of wireless communication (4G LTE, 5G, etc.) for exchanging data with a central control system that manages delivery, the bandwidth of a wireless communication module mounted on each of the lead vehicle and the droid vehicle may be increased through bonding.

Accordingly, the present invention may integrally collect sensor data of a lead vehicle and sensor data of a droid vehicle in consideration of the arrangement position of sensors in a structure in which the lead vehicle and the droid vehicle are mutually coupled and may efficiently reduce the cost required for constructing computing resources by distributing and processing the collected sensor data using the processor of the lead vehicle and the processor of the droid vehicle.

Figure 10:
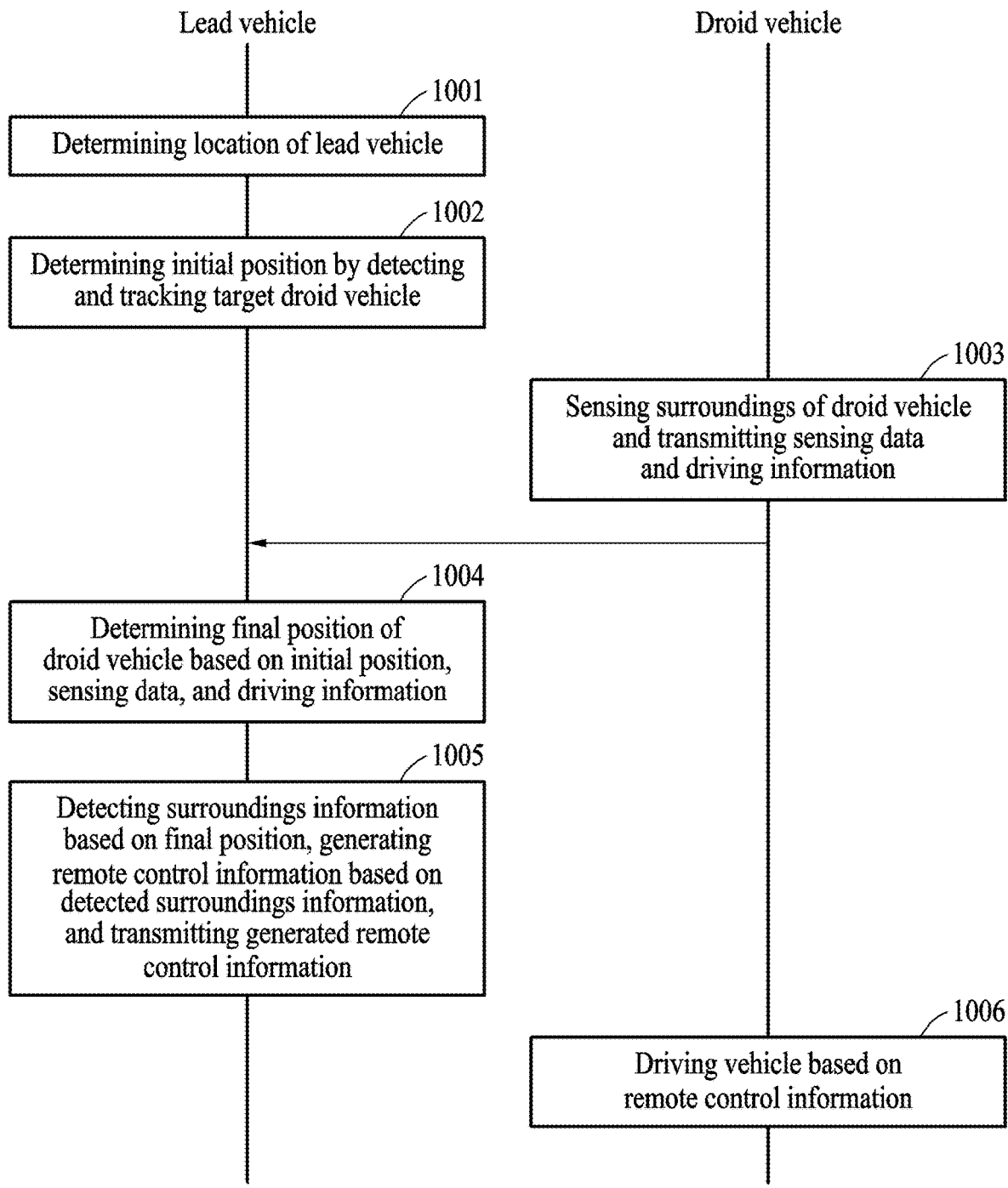
FIG. 10 is a diagram for explaining remote control of a droid vehicle in a system for providing a delivery service using autonomous vehicles according to one embodiment of the present invention.

FIG. 10 is a diagram for explaining remote control of a droid vehicle in the system for providing a delivery service using autonomous vehicles according to one embodiment of the present invention.

Referring to FIG. 10, the droid vehicle may transmit sensor data obtained by multiple sensors mounted thereon and driving data obtained during driving to the lead vehicle through a wireless communication network. When necessary, a portion of an autonomous driving function may be distributed and allocated to the droid vehicle, and results processed through a processing system (CPU) built in the droid vehicle may be transmitted to the lead vehicle.

Specifically, in step 1001, the lead vehicle determines the position of the lead vehicle. That is, the lead vehicle uses multiple sensors to determine the current location thereof.

In step 1002, the lead vehicle detects and tracks a target droid vehicle to determine the initial position thereof.

That is, the lead vehicle arriving at the entry point of the last mile detects and tracks the position of the droid vehicle when moving apart from the droid vehicle, and calculates the relative movement position with the droid vehicle from the current position value of the lead vehicle set in step 1001 to determine the initial location information of the droid vehicle.

In step 1003, the droid vehicle senses the surroundings thereof and transmits sensing data and driving information to the lead vehicle.

For example, for service missions, in addition to control values, the droid vehicle may transmit service-related information to the lead vehicle or receive service-related information from the lead vehicle.

In step 1004, the lead vehicle determines the final position of the droid vehicle based on the initial position, the sensing data, and the driving information.

Here, the initial position and the data about landmarks around a route during movement of the droid vehicle obtained from the mounted sensors (lidar, etc.) may be applied as inputs to the location recognition function built in the droid vehicle and may be used to calculate the final position information of the droid vehicle.

That is, the lead vehicle determines the final position of the droid vehicle based on the initial position of the droid vehicle and the sensing data and driving information transmitted from the droid vehicle.

For example, when the droid vehicle does not have a localization (location recognition) function, sensor data may be transmitted to the lead vehicle, and final position information may be calculated through the localization (location recognition) function of the lead vehicle. When calculating location information, precision map data of the lead vehicle may be used.

In step 1005, the lead vehicle may detect surroundings information based on the final position, generate remote control information based on the detected surroundings information, and transmit the generated remote control information to the droid vehicle.

Here, the lead vehicle performs a surroundings recognition function. When the droid vehicle is located within a range that may be detected using multiple sensors mounted on the lead vehicle, on the same 3D coordinate system, obstacle (object) information around the droid vehicle may be recognized and used for planning the driving route of the droid vehicle.

In addition, the droid vehicle may transmit data obtained by sensors mounted thereon to the lead vehicle to process a driving recognition algorithm, or may perform a built-in driving recognition algorithm and transmit the processed result to the lead vehicle to perform a driving recognition function.

Here, the lead vehicle calculates the optimal driving route of the droid vehicle based on the final position of the droid vehicle, surroundings information, and precision map (HD-MAP) information, generates a real-time control signal, and transmits the real-time control signal to the droid vehicle.

That is, the lead vehicle uses information received from the droid vehicle to perform location recognition, driving environment recognition, route planning, and control functions of the droid vehicle, and transmits the remote control result through a wireless communication network to complete remote control.

In step 1006, the droid vehicle moves to a destination by driving the vehicle based on the remote control information transmitted from the lead vehicle.

For example, the droid vehicle may have an emergency avoidance driving function.

Accordingly, the present invention may overcome limitations in constructing an autonomous driving environment for a droid vehicle and improve autonomous driving performance of the droid vehicle by remotely controlling the droid vehicle after the droid vehicle is separated from a lead vehicle.

Figure 11:
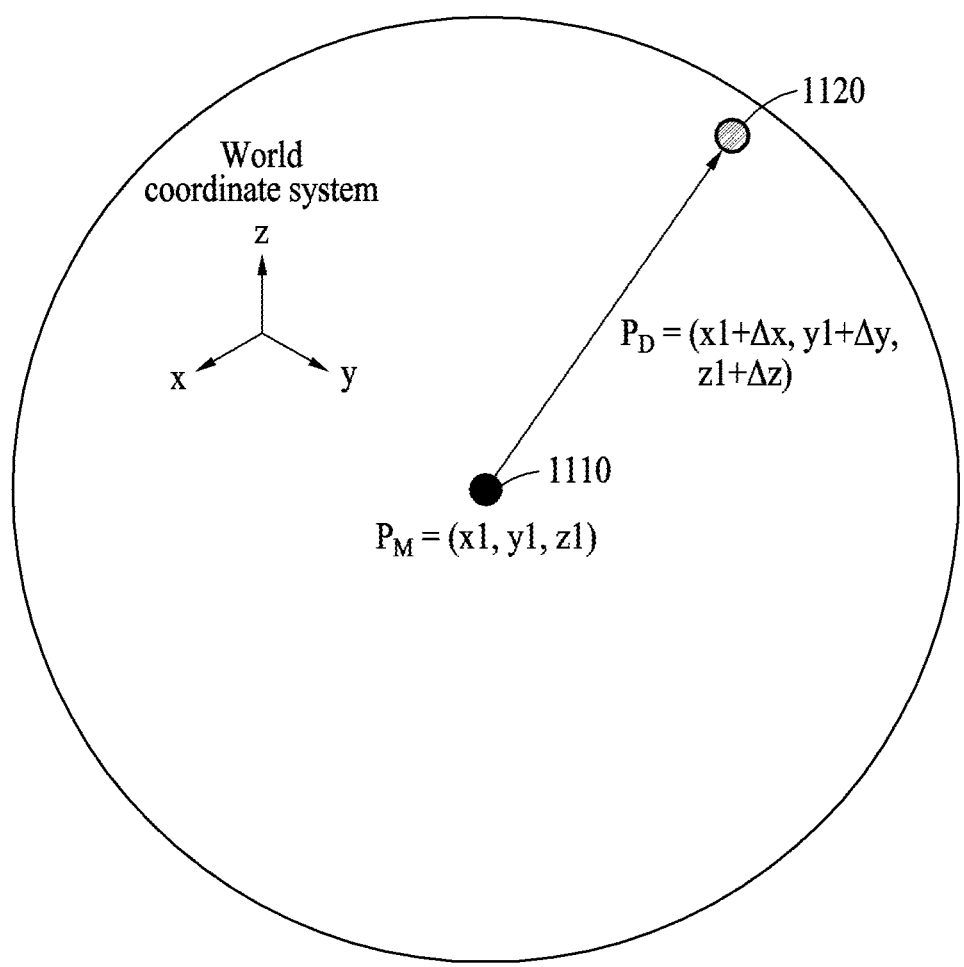
FIG. 11 is a diagram for explaining a configuration in which a lead vehicle recognizes the position of a droid vehicle in a system for providing a delivery service using autonomous vehicles according to one embodiment of the present invention.

FIG. 11 is a diagram for explaining a configuration in which a lead vehicle recognizes the position of a droid vehicle in the system for providing a delivery service using autonomous vehicles according to one embodiment of the present invention.

Referring to FIG. 11, on a world coordinate system 1100, a lead vehicle 1110 is located in the center, and a droid vehicle 1120 is located.

To perform each function, the lead vehicle 1110 and the droid vehicle 1120 may be configured to express the coordinate system of each sensor system on the single world coordinate system 1100.

For example, when the positional coordinates of the lead vehicle 1110 are (x1, y1, z1), the positional coordinates of the droid vehicle 1120 may be expressed as (x1+Δx, y1+Δy, z1+Δz).

The apparatus described above may be implemented as a hardware component, a software component, and/or a combination of hardware components and software components. For example, the apparatus and components described in the embodiments may be achieved using one or more general purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and one or more software applications executing on the operating system. In addition, the processing device may access, store, manipulate, process, and generate data in response to execution of the software. For ease of understanding, the processing apparatus may be described as being used singly, but those skilled in the art will recognize that the processing apparatus may include a plurality of processing elements and/or a plurality of types of processing elements. For example, the processing apparatus may include a plurality of processors or one processor and one controller. Other processing configurations, such as a parallel processor, are also possible.

The methods according to the embodiments of the present invention may be implemented in the form of a program command that can be executed through various computer means and recorded in a computer-readable medium. The computer-readable medium can store program commands, data files, data structures or combinations thereof. The program commands recorded in the medium may be specially designed and configured for the present invention or be known to those skilled in the field of computer software. Examples of a computer-readable recording medium include magnetic media such as hard disks, floppy disks and magnetic tapes, optical media such as CD-ROMs and DVDs, magneto-optical media such as floptical disks, or hardware devices such as ROMs, RAMs and flash memories, which are specially configured to store and execute program commands. Examples of the program commands include machine language code created by a compiler and high-level language code executable by a computer using an interpreter and the like. The hardware devices described above may be configured to operate as one or more software modules to perform the operations of the embodiments, and vice versa.

The software may include computer programs, code, instructions, or a combination of one or more of the foregoing, configure the processing apparatus to operate as desired, or command the processing apparatus, either independently or collectively. In order to be interpreted by a processing device or to provide instructions or data to a processing device, the software and/or data may be embodied permanently or temporarily in any type of a machine, a component, a physical device, a virtual device, a computer storage medium or device, or a transmission signal wave. The software may be distributed over a networked computer system and stored or executed in a distributed manner. The software and data may be stored in one or more computer-readable recording media.

Although the present invention has been described with reference to limited embodiments and drawings, it should be understood by those skilled in the art that various changes and modifications may be made therein. For example, the described techniques may be performed in a different order than the described methods, and/or components of the described systems, structures, devices, circuits, etc., may be combined in a manner that is different from the described method, or appropriate results may be achieved even if replaced by other components or equivalents.

Therefore, other embodiments, other examples, and equivalents to the claims are within the scope of the following claims.

The invention claimed is:

1. A system for providing a delivery service using autonomous vehicles, wherein the system provides a delivery service on an irregular road where entry of normal vehicles is not allowed and a regular road where entry of small and low-speed vehicles is not allowed and comprises a droid vehicle for providing a delivery service using limited autonomous driving performance in a last mile delivery section corresponding to the irregular road; and a lead vehicle for providing a delivery service based on autonomous driving on the regular road, transporting the droid vehicle by being coupled to the droid vehicle on the regular road, and remotely controlling driving of the droid vehicle after being separated from the droid vehicle in the last mile delivery section, wherein the lead vehicle comprises first multiple sensors and performs the autonomous driving, wherein the droid vehicle comprises second multiple sensors and provides the limited autonomous driving performance, and wherein the lead vehicle:

calculates a position using the first multiple sensors, calculates an initial position of the droid vehicle by calculating a change in a relative position of the droid vehicle by using the first multiple sensors, calculates a final position of the droid vehicle using the calculated initial position and second multiple sensors-based second sensor data transmitted from the droid vehicle, detects surroundings at the calculated final position using the second sensor data, remotely controls driving of the droid vehicle in consideration of the detected surroundings, applies the calculated final position to precision map information to calculate a driving route to a destination where the delivery service is provided, remotely controls driving of the droid vehicle by generating a remote control signal according to the calculated driving route, receives driving information corresponding to the change in the relative position of the droid vehicle on the driving route from the droid vehicle, and remotely controls a partial autonomous driving of the droid vehicle in consideration of the driving information.

2. The system according to claim 1, wherein the lead vehicle selectively drives the first multiple sensors and the second multiple sensors in a distributed manner to recognize all directions for the coupled state between the lead vehicle and the droid vehicle, and performs autonomous driving on the regular road based on the recognized all directions when the lead vehicle is coupled to the droid vehicle.

3. The system according to claim 2, wherein, when the lead vehicle is coupled to the droid vehicle, the lead vehicle recognizes a relative location of the droid vehicle and selectively drives the first multiple sensors and the second multiple sensors in a distributed manner based on the recognized relative location to collect integrated sensor data.

4. The system according to claim 3, wherein the lead vehicle comprises a first processor for processing first sensor data of the first multiple sensors, the droid vehicle comprises a second processor for processing second sensor data of the second multiple sensors, and when the lead vehicle is coupled to the droid vehicle, some of the integrated sensor data is processed using the first processor, the remaining data except for the partial data is transmitted to the droid vehicle, and the remaining data is processed using the second processor.

5. The system according to claim 4, wherein, when the lead vehicle is coupled to the droid vehicle, the lead vehicle collects the integrated sensor data by minimizing an overlapping area of the first sensor data and the second sensor data.

6. The system according to claim 1, wherein the lead vehicle comprises a first battery, the droid vehicle comprises a second battery, and when the lead vehicle is coupled to the droid vehicle, the lead vehicle controls at least one of sharing, charging, and using electrical energy between the first and second batteries.

7. The system according to claim 6, wherein, when the droid vehicle is coupled to the lead vehicle, the droid vehicle is moved by power based on the first battery or supports power based on the second battery.

8. The system according to claim 7, wherein, when the droid vehicle supports power based on the second battery, the droid vehicle supports direction rotation based on a rotational speed difference between two wheels or supports movement speed control by increasing or decreasing rotational speed of the wheels.

9. The system according to claim 1, wherein the droid vehicle is automatically coupled to or released from the lead vehicle in at least one form of a trailer form and a train form using a coupler.

10. A method of providing a delivery service using autonomous vehicles, wherein the method provides a delivery service on an irregular road where entry of normal vehicles is not allowed and a regular road where entry of small and low-speed vehicles is not allowed and comprises a step of, by a lead vehicle, providing a delivery service based on autonomous driving on the regular road while transporting a droid vehicle by being coupled to the droid vehicle on the regular road;

a step of, by the lead vehicle, remotely controlling driving of the droid vehicle after the lead vehicle is separated from the droid vehicle in a last mile delivery section corresponding to the irregular road; and a step of, by the droid vehicle, providing a delivery service in the last mile delivery section based on the remote control driving, wherein the lead vehicle comprises first multiple sensors and performs the autonomous driving, wherein the droid vehicle comprises second multiple sensors and provides the limited autonomous driving performance, wherein the step of remotely controlling driving of the droid vehicle after the lead vehicle is separated from the droid vehicle in a last mile delivery section corresponding to the irregular road comprises:

a step of calculating a position using the first multiple sensors, calculates an initial position of the droid vehicle by calculating a change in a relative position of the droid vehicle by using the first multiple sensors, a step of calculating a final position of the droid vehicle using the calculated initial position and second multiple sensors-based second sensor data transmitted from the droid vehicle, a step of applying the calculated final position to precision map information to calculate a driving route to a destination where the delivery service is provided, a step of detecting surroundings at the calculated final position using the second sensor data and remotely controlling driving of the droid vehicle in consideration of the detected surroundings and the calculated driving route, and a step of receiving driving information corresponding to the change in the relative position of the droid vehicle on the driving route from the droid vehicle, and remotely controls a partial autonomous driving of the droid vehicle in consideration of the driving information.

11. The method according to claim 10, wherein the step of providing a delivery service based on autonomous driving on the regular road while transporting a droid vehicle by being coupled to the droid vehicle on the regular road comprises:
- a step of recognizing a relative location of the droid vehicle when coupled to the droid vehicle and selectively driving the first multiple sensors and the second multiple sensors in a distributed manner based on the recognized relative location to collect integrated sensor data;
- a step of recognizing all directions for the coupled state between the lead vehicle and the droid vehicle based on the collected integrated sensor data; and
- a step of performing autonomous driving on the regular road based on the recognized all directions.

12. The method according to claim 11, wherein the step of recognizing all directions for the coupled state between the lead vehicle and the droid vehicle based on the collected integrated sensor data comprises a step of processing some of the integrated sensor data using a first processor of the lead vehicle; and
- a step of transmitting the remaining data except for the partial data to the droid vehicle and processing the partial data using a second processor of the droid vehicle.

* * * * *